May 19, 1931.    F. F. BEGUE ET AL    1,805,562
CLOSURE FOR A FILLER OPENING FOR RECEPTACLES
Filed Nov. 21, 1928

INVENTORS
Frederick F. Begue and
James A. McIntosh
BY
Stuart C. Barnes
ATTORNEY.

Patented May 19, 1931

1,805,562

UNITED STATES PATENT OFFICE

FREDERICK F. BEGUE AND JAMES A. McINTOSH, OF DETROIT, MICHIGAN, ASSIGNORS TO STANDARD TUBE AND MANUFACTURING COMPANY, OF DETROIT, MICHIGAN, A CORPORATION OF MICHIGAN

CLOSURE FOR A FILLER OPENING FOR RECEPTACLES

Application filed November 21, 1928. Serial No. 320,820.

This invention relates to a closure for a filler opening of receptacles, with special reference to the filler necks of radiators and fuel tanks of automotive vehicles and the like.

The invention aims to provide a cap which can be quickly attached and quickly removed, and which at the same time forms an effective liquid tight seal. A sealing member is incorporated in the cap for sealing tightly against the end of the filler tube. This sealing member may advantageously be backed up by a spring, which spring also cooperates with bayonet type connection which is utilized for connecting the closure cap with the filler tube.

Figure 1:
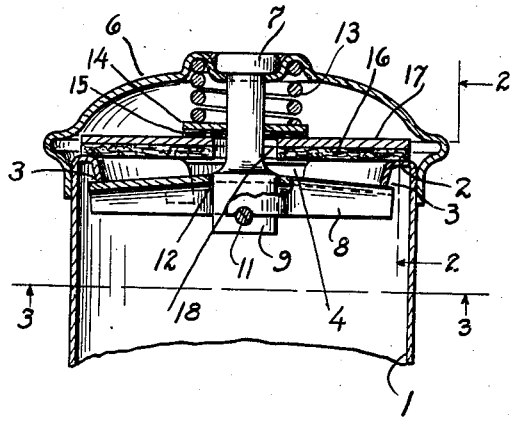
Fig. 1 is a sectional view taken through the cap as applied to the filler tube.

The filler tube is shown in Fig. 1 and the top thereon is flanged over as at 2, and then turned downwardly to form depending cam surfaces 3, which are spaced apart by slots 4. The cam surfaces may terminate in abutments 5.

Figure 2:
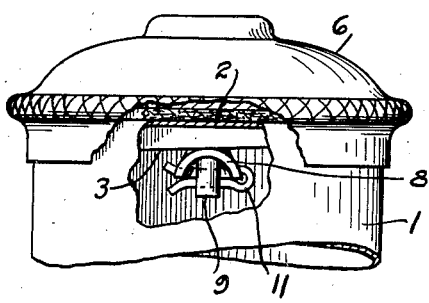
Fig. 2 is a side elevation taken at right angles to Fig. 1 with parts cut away to illustrate the construction of the cap.
Figure 3:
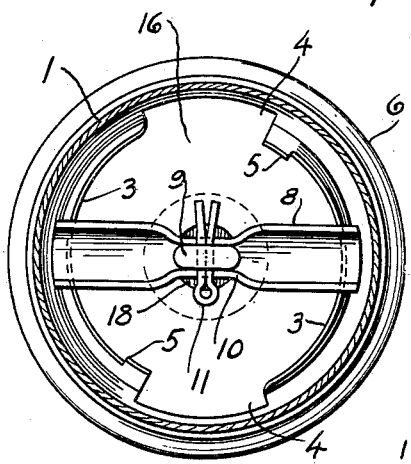
Fig. 3 is a sectional view taken on line 3—3 of Fig. 1.

The cap 6 is designed to fit over the tube, and the same is provided with a central stud 7 which may be fixedly secured as by means of a weld connection with the cap. Near the end of the stud there is mounted a cross member 8 the ends of which are designed to pass through the slots 4 and then upon relative rotational movement between the cap and tube move into engagement with the cam surfaces. This cross member 8 may be advantageously stamped from sheet metal and be generally U shaped in cross-section, as shown in Fig. 2. The end of the stud may be flattened as at 9 with the cross member 8 appropriately shaped as at 10 to nicely fit the same, and the two may be secured together by means of an ordinary cotter key 11. The cross piece is apertured as at 12 to permit the stud to pass therethrough, and the fit may be such as to not provide for any substantial pivotal movement.

Around the stud there is disposed a coil spring 13 which backs up against the cap at one end and which rests upon a metal washer 14. Below this metal washer is a gasket member 15 which tightly engages the stud so as to effect a liquid seal.

For sealing the top of the tube a suitable sealing element, such as a fiber disc 16 is placed over the stud and backed up by a metal disc 17. These two members are apertured as at 18, and the aperture is considerably larger than the stud to permit a large degree of movement of the disc and sealing member with respect to the stud.

With this construction, it will be noted that the spring, which is under pressure when the parts are assembled, holds the sealing cap down tightly against the cross arm 8 when the cap is detached from the tube. In order to permit ease in mounting the cap on the tube, it is desirable that the ends of the cross arm be capable of readily engaging underneath the cam surfaces. To accomplish this the cross arm may be of bent formation or angled somewhat as clearly shown in Fig. 1, so that its highest point is near its center line adjacent the stud, while the ends are dropped down from this high point. Accordingly when the cap is removed as shown in Fig. 5, the ends of the cross arm are spaced from the sealing washer 16. The sealing washer 16 is pressed against the central portion of the cross arm.

A cap thus constructed effects a very good liquid tight seal, for when the cap is turned to engage the cross member under the cam surfaces, the cap is pulled downwardly by the cam action, thus compressing the spring, which in turn, urges the sealing washer 16 tightly against the end of the tube.

In a structure of this nature, the several parts are not machined to precise measurements and dimensions, and accordingly there may be some variation in the positions of the shoulders 2. To accommodate for this the sealing washer and its backing disc are provided with the enlarged aperture 18 so that the washer and disc can freely move universally as regards the stud, and thus to readily accommodate itself to the shoulders.

Figure 4:
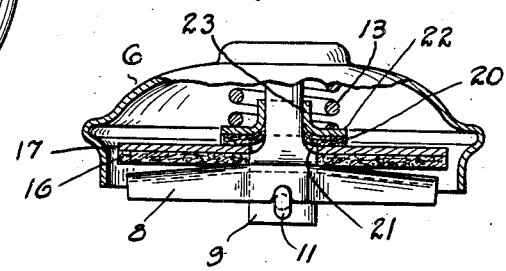
Fig. 4 is a view of the cap which embodies a modified sealing arrangement.

It is, of course, desirable to have a liquid seal around the stud, and in Fig. 4 is shown a cap with a modified washer arrangement which is designed to provide a very effective seal around the stud. In this case the sealing washer is shown at 20, and it tightly engages the stud. The aperture in the washer may be such as to cause the washer to fit the stud so tightly as to deform the same slightly as at 21. For protecting the washer there is a member with a disc part 22 lying over the same which is shaped with a collar 23 sleeved over the stud. The curvature of the part between the collar and disc portions is such as to tend to compact the material of the washer 21 tightly against the stud. This arrangement, however, will not interfere with the universal movement of the sealing washer in adjusting itself to the top of the tube.

Claims:

1. A closure cap for attachment to a tube or the like to be closed which is provided with double bayonet type slots with cam shaped shoulders between the slots, comprising a cap for fitting over the tube, a stud depending centrally of the cap, a cross member on the lower end of the stud for passing through the said slots, and for engagement under the shoulders upon relative rotational movement of cap and tube, a sealing member in the cap, and resilient means acting upon said sealing member and arranged to urge the sealing member against the top of the tube as a said cross member is moved along the cam surfaces.

2. A closure cap for attachment to a tube or the like to be closed which is provided with double bayonet type slots with cam shaped shoulders between the slots, comprising a cap for fitting over the tube, a stud depending centrally of the cap, a cross member on the lower end of the stud for passing through the said slots and for engagement under the shoulders upon relative rotational movement of the cap and tube, a sealing member in the cap, and resilient means acting upon said sealing member arranged to urge the sealing member against the top of the tube as a said cross member is moved along the cam surfaces, said sealing member being substantially universally movable with relation to the stud whereby to readily accommodate itself to the end of the tube.

3. A closure cap for attachment to a tube or the like to be closed which is provided with double bayonet type slots with cam shaped shoulders between the slots, comprising a cap for fitting over the tube, a stud centrally of the cap, a cross member on the end of the stud for passing through the said slots, and for engagement under the shoulders upon relative rotational movement of cap and tube, a sealing member in the cap through which the stud extends, resilient means acting upon said sealing member arranged to urge the sealing member against the top of the tube as a said cross member is moved along the cam surfaces, and means for effecting a liquid tight seal around the stud at the point where it extends through the sealing member.

4. A closure cap for attachment to a tube or the like to be closed which is provided with double bayonet type slots with cam shaped shoulders between the slots, comprising a cap for fitting over the tube, a stud centrally of the cap, a cross member on the end of the stud for passing through the said slots and for engagement under the shoulders upon relative rotational movement of cap and tube, a sealing member in the cap, resilient means acting upon said sealing member and arranged to urge the sealing member against the top of the tube as a said cross member is moved along the cam surfaces, said sealing member having a relatively large aperture through which the stud passes, and a sealing device for effecting a liquid tight seal around the stud.

5. A closure cap for attachment to a tube or the like to be closed which is provided with double bayonet type slots with cam shaped shoulders between the slots, comprising a cap for fitting over the tube, a stud centrally of the cap, a cross member on the end of the stud for passing through the said slots and for engagement under the shoulders upon relative rotational movement of cap and tube, a sealing member in the cap, resilient means acting upon said sealing member arranged to urge the sealing member against the top of the tube as a said cross member is moved along the cam surfaces, said sealing member having a relatively large aperture through which the stud passes, a sealing device for effecting a liquid tight seal around the stud, said sealing device consisting of a packing member and metallic protecting device for the packing member having a sleeve shaped part tightly engaging with the stud, and a disc shaped part overlying the packing member.

6. A closure cap for attachment to a tube or the like to be closed which is provided with double bayonet type slots with cam shaped shoulders between the slots comprising a cap, a stud permanently carried by the cap, a cross member on the end of the stud, a sealing member between the cap and cross member, and a coil spring disposed between the top of the cap and sealing member and urging the same toward the cross member, said coil spring being adapted to be compressed as the cross member is positioned under the cam shaped shoulders by relative turning movement of the cap and tube whereby to urge the sealing member against the end of the tube.

7. A closure cap for attachment to a tube or the like to be closed which is provided with double bayonet type slots with cam shaped shoulders between the slots, comprising a cap, a stud in the cap, a cross member on the end of the stud for passing through the said slots and under the cam shoulders by relative turning movement, said cross member being of angle form so that its ends are disposed in a plane below the central part, a sealing washer within the cap, and a spring urging the washer against the cross member, the formation of the cross member effecting a spacing between the ends thereof and the washer to permit readily engagement of the cross member under the cam shoulders.

8. A closure cap for attachment to a tube or the like to be closed which is provided with double bayonet type slots with cam shaped shoulders between the slots, comprising a cap, a stud in the cap, a cross member on the end of the stud for passing through the said slots and under the cam shoulders by relative turning movement, said cross member being of angle form so that its ends are disposed in a plane below the central part, a sealing washer within the cap, a spring urging the washer against the cross member, the formation of the cross member effecting spacing between the ends thereof and the washer to permit readily engagement of the cross member under the cam shoulders, said cross member made of a stamping generally U shape in cross-section, and the end of the stud being flattened with the legs of the U engaging same.

9. A closure for attachment to a tube or the like, which is provided with double bayonet type slots with cam shaped shoulders between the slots comprising a cap, a centrally disposed stud in the cap, a spring surrounding the stud, a sealing washer against which the spring abuts, a cross member which is U shaped in cross-section which is provided with an aperture for receiving the end of the stud, said cross member when in position on the stud compressing the said spring, and a pin extending through the stud for holding the spring, washer, and cross member assembled thereon.

10. A closure cap for attachment to a tube or the like, which is provided with double bayonet type slots with cam shaped shoulders between the slots comprising a cap, a centrally disposed stud in the cap, a spring surrounding the stud, a sealing washer against which the spring abuts, a cross member which is U shaped in cross-section which is provided with an aperture for receiving the end of the stud, the said end of the stud being flattened, said cross member when in position on the stud compressing the said spring, and a pin extending through the stud for holding the spring, washer, and cross member assembled thereon, the legs of the U of the said cross member being shaped to snugly fit the flat portion of the stud.

In testimony whereof we affix our signatures.

FREDERICK F. BEGUE.
JAMES A. McINTOSH.